March 22, 1927.
A. HOPE
1,622,143
EGG HOLDER
Filed Aug. 28, 1926
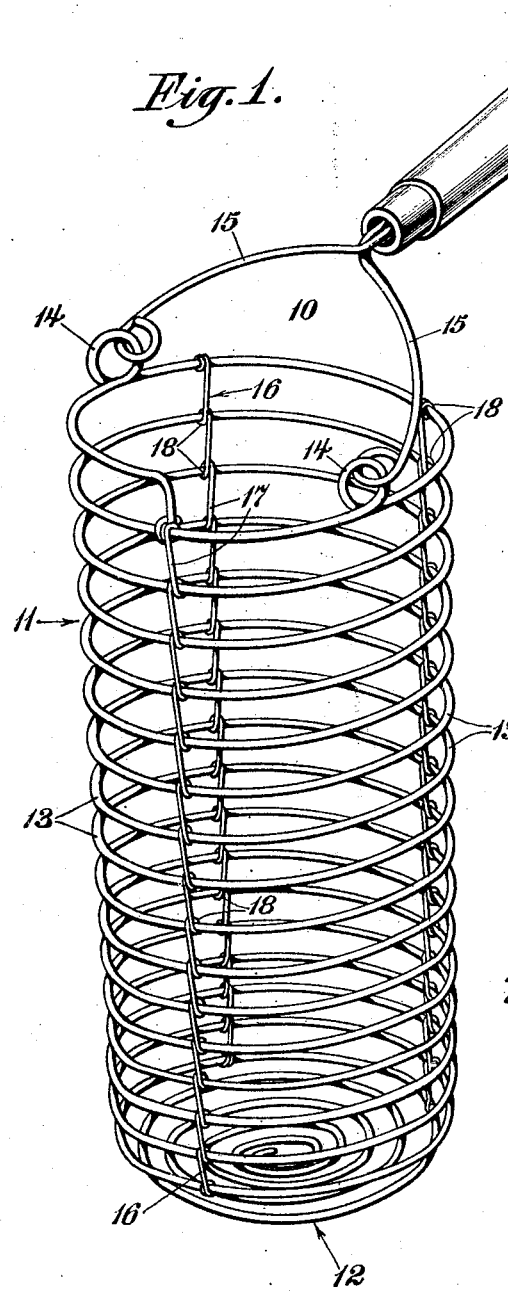
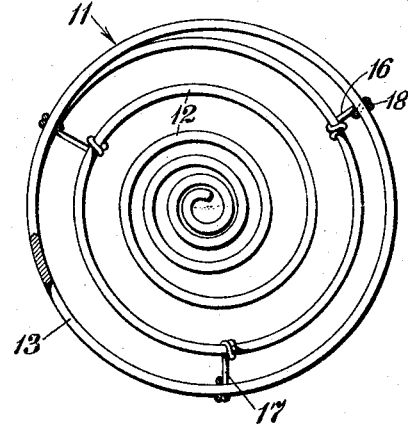
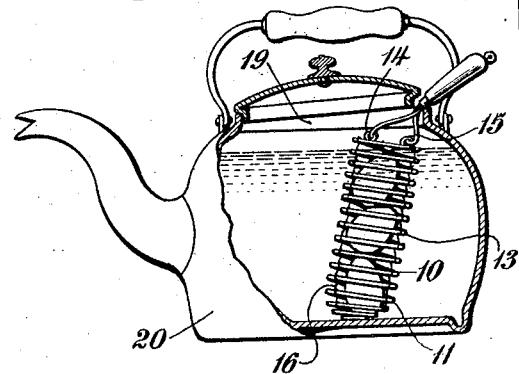
Alfred Hope
INVENTOR
BY Victor J. Evans
ATTORNEY Patented Mar. 22, 1927.

1,622,143

UNITED STATES PATENT OFFICE.

ALFRED HOPE, OF NEW YORK, N. Y.

EGG HOLDER.

Application filed August 28, 1926. Serial No. 132,223.

This invention relates to improvements in egg holders and has particular reference to an article for holding eggs, during the boiling of the same.

The primary object of the invention resides in an egg holder capable of holding one or more eggs in stack formation while in a pot or kettle of boiling water, so that the eggs are prevented from touching the bottom of the cooking utensil, contact with which causes cracking of the eggs when boiling.

Another object of the invention is to provide an egg holder designed to fit within a kettle of water, the body of which is elongated for receiving the eggs in stack formation, there being a handle attached to the body which is adapted to extend out of the kettle for the purpose of lifting the holder out of the boiling water when the eggs are cooked, and which handle permits the holder to be held under a cold water faucet to cool the same, after which the holder is inverted and the eggs dropped one at a time from the open end of the same and into the hand of a person holding the device without fear of being burned.

Another object of the invention is to provide an egg holder which is simple in construction, inexpensive of manufacture, and highly efficient for the purpose intended.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of my improved egg holder.

Figure 2 is a horizontal sectional view therethrough.

Figure 3 is a view showing the position of the egg holder in a kettle of water.

Referring more particularly to the drawing, the reference numeral 10 designates my improved egg holder in its entirety and which includes an elongated body 11, opened at one end and closed at its opposite end, and which body is relatively open throughout its length to permit the water to surround the eggs which are adapted to be contained therein, when the holder is in use as shown in Figure 3 of the drawing.

The body 11 is formed of a single piece of relatively stiff bendable wire which is coiled at one end to provide a closed bottom 12, after which the wire is helically wound to provide spaced convolutions 13 which serve as the walls of the body 11. The wire forming the top convolution is bent to provide opposed eyes 14 to which the ends of a U-shaped bail 15 are swingingly connected. Longitudinal braces 16 extend along the sides of the body and comprise bendable wires 17 which are bent about the convolutions of the body as at 18 for holding the body in shape. If desired, the wires 17 may extend along the outside of the body without being bent about the convolutions but held thereon by placing a drop of solder at the intersection between the brace wires and the convolutions.

A wooden handle or the like extends from the bight portion of the U-shaped bail and serves as a means by which the holder may be carried.

In the use of the device, the eggs to be boiled are placed into the body 11 through the open end thereof, so that they lie one against the other with their rounded ends in contact. The device is then inserted through an opening 19 in the kettle 20 shown in Figure 3 of the drawings, it being appreciated that the kettle contains a quantity of water sufficient to cover all the eggs. After placing the holder into the kettle, the handle is swung down so as to lie opposite the kettle over which the lid is applied to cover the opening 19 and the kettle placed on the stove to boil. It will be noted that all of the eggs are held from contact with the bottom of the kettle and are surrounded with water, whereby cracking of the eggs during the boiling is prevented. It will be appreciated that eggs often become cracked during the boiling of the same when they are placed on the bottom of a pot or kettle, due to the direct heat from the flame over which the utensil is placed. After the eggs have been boiled the required length of time, the handle is grasped by the hand of an operator and the device lifted from the kettle and placed under a cold water faucet for cooling the same. The holder may now be inverted and the eggs caused to drop from the open end thereof into the hand of the person cooking the same, without fear of burning the hand.

By designing the holder to fit within the restricted opening of a kettle, it is possible to use the heated water in which the eggs were cooked for other purposes such as washing dishes after a meal. It is very often the practice of a housewife to place a kettle of water on the stove for heating and adapted to be used for washing dishes, so that it will be appreciated that my holder serves to save the expense of heat and time in preparing a separate pot of water for the boiling of eggs.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

An egg holder comprising an elongated body adapted to receive a plurality of eggs in stack formation one above the other formed of a single piece of wire coiled to provide a closed bottom therefor, said wire being helically wound to provide side walls for said body, the convolutions being spaced from each other, longitudinal braces extending the length of said body and fixedly mounted to the convolutions by twisting the same therearound, opposed eyes formed in the uppermost convolution, and a handle member swingingly connected to said eyes substantially as and for the purpose specified.

In testimony whereof I have affixed my signature.

ALFRED HOPE.